(12) United States Patent
Kobayashi et al.

(10) Patent No.: US 10,230,997 B2
(45) Date of Patent: Mar. 12, 2019

(54) MANAGEMENT DEVICE AND IMAGE PROCESSING SYSTEM

(71) Applicant: PANASONIC INTELLECTUAL PROPERTY MANAGEMENT CO., LTD., Osaka (JP)

(72) Inventors: Masaaki Kobayashi, Fukuoka (JP); Masakatsu Matsuo, Fukuoka (JP); Kouji Mutou, Fukuoka (JP); Katsunori Kogata, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/524,108

(22) PCT Filed: Nov. 30, 2015

(86) PCT No.: PCT/JP2015/005939
§ 371 (c)(1),
(2) Date: May 3, 2017

(87) PCT Pub. No.: WO2016/088347
PCT Pub. Date: Jun. 9, 2016

(65) Prior Publication Data
US 2017/0318316 A1    Nov. 2, 2017

(30) Foreign Application Priority Data

Dec. 5, 2014  (JP) .................................. 2014-246924

(51) Int. Cl.
*H04N 21/235* (2011.01)
*H04N 21/2343* (2011.01)
(Continued)

(52) U.S. Cl.
CPC ......... *H04N 21/2343* (2013.01); *H04L 9/085* (2013.01); *H04L 9/0894* (2013.01);
(Continued)

(58) Field of Classification Search
CPC ................. H04N 21/21; H04N 21/218; H04N 21/21805; H04N 21/2181;
(Continued)

(56) References Cited

U.S. PATENT DOCUMENTS 9,794,604 B2 * 10/2017 Ohno ................. H04N 21/2402
2013/0268829 A1 * 10/2013 Lansford ............. G06F 17/2235
715/205

(Continued)

FOREIGN PATENT DOCUMENTS

| JP | 2004-274320 | 9/2004 |
| JP | 2007-010862 | 1/2007 |
| JP | 2014-138314 | 7/2014 |

OTHER PUBLICATIONS

The Extended European Search Report from the European Patent Office (EPO) dated Nov. 8, 2017 for the related European Patent Application No. 15864842.8.

(Continued)

*Primary Examiner* — Hsiungfei Peng
(74) *Attorney, Agent, or Firm* — Greenblum & Bernstein P.L.C.

(57) ABSTRACT

A resolution converter converts input image data to N types (N is a plural number) of image data having resolutions different with each other. A secret sharing unit performs secret sharing schemes so that the plurality of pieces of image data are respectively divided into n pieces (n is an integer equal to or more than N+1 and the same value in all of image data) of distributed data and the distributed data is reconstructed to original image data using k pieces (k is an (Continued)

integer equal to or more than 2 and equal to or less than n and different value for each piece of image data) among n pieces. A data combination unit generates n pieces of combination data by combining distributed data selected one by one so as not to overlap with each of resolutions and stores each piece of the combination data in different storages. As more pieces of distributed data are gathered, image data with higher resolutions can be reproduced and security for copyright, privacy, or the like can be secured in each piece of distributed data.

18 Claims, 13 Drawing Sheets

(51) Int. Cl.

| | |
|---|---|
| *H04N 21/2347* | (2011.01) |
| *H04L 9/08* | (2006.01) |
| *H04N 21/231* | (2011.01) |
| *H04N 5/913* | (2006.01) |
| *H04N 9/80* | (2006.01) |
| *H04N 19/88* | (2014.01) |
| *H04N 7/01* | (2006.01) |
| *H04N 21/61* | (2011.01) |

(52) U.S. Cl.
CPC ............ *H04N 5/913* (2013.01); *H04N 7/0117* (2013.01); *H04N 9/80* (2013.01); *H04N 19/88* (2014.11); *H04N 21/231* (2013.01); *H04N 21/235* (2013.01); *H04N 21/2347* (2013.01); *H04N 21/23439* (2013.01); *H04N 21/234327* (2013.01); *H04N 21/6125* (2013.01); *H04N 21/6175* (2013.01); *H04N 2005/91357* (2013.01)

(58) Field of Classification Search
CPC ............. H04N 21/21815; H04N 21/23; H04N 21/231; H04N 21/23103; H04N 21/23109; H04N 21/23116
See application file for complete search history.

(56) References Cited

U.S. PATENT DOCUMENTS

2014/0307090 A1 10/2014 Kobayashi et al.
2016/0301975 A1* 10/2016 Kitazato ................ H04N 19/30

OTHER PUBLICATIONS

International Search Report (ISR) from International Searching Authority (Japan Patent Office) in International Pat. Appl. No. PCT/JP2015/005939, dated Jan. 12, 2016.

* cited by examiner

FIG. 3

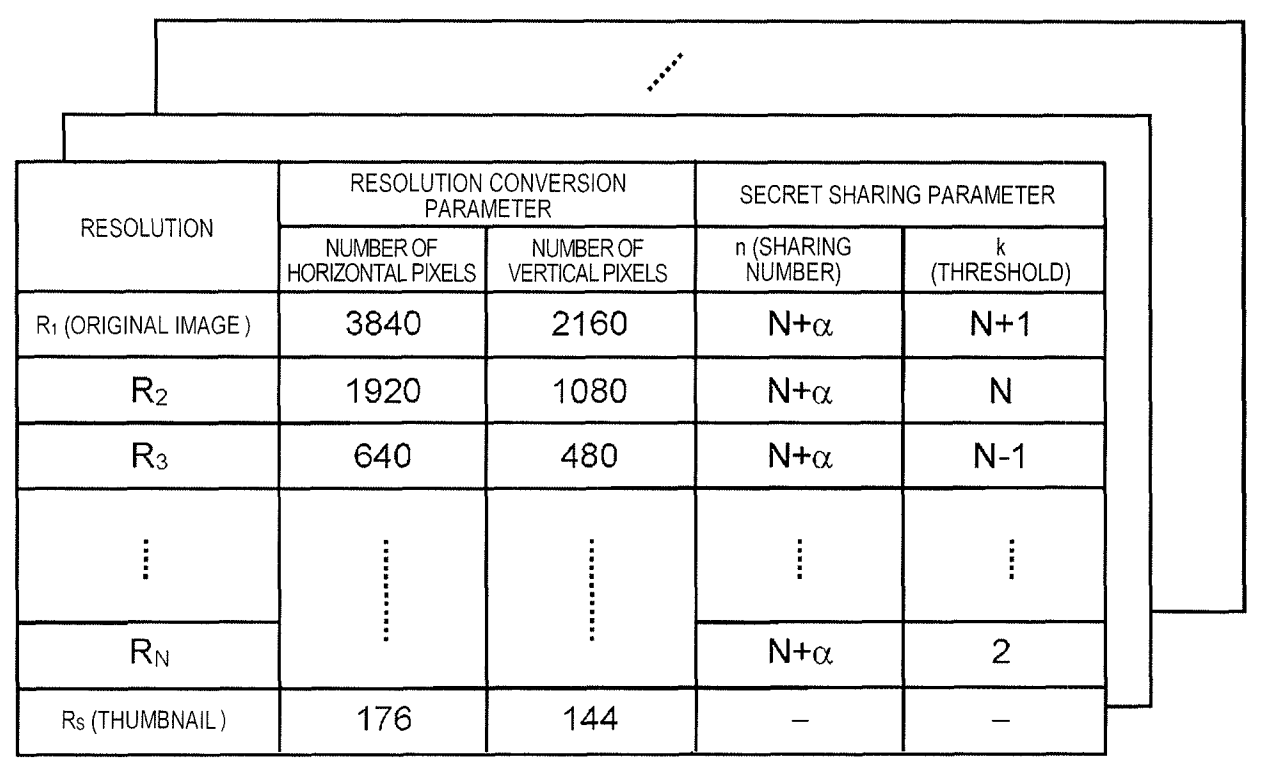

| RESOLUTION | RESOLUTION CONVERSION PARAMETER | | SECRET SHARING PARAMETER | |
|---|---|---|---|---|
| | NUMBER OF HORIZONTAL PIXELS | NUMBER OF VERTICAL PIXELS | n (SHARING NUMBER) | k (THRESHOLD) |
| $R_1$ (ORIGINAL IMAGE) | 3840 | 2160 | N+α | N+1 |
| $R_2$ | 1920 | 1080 | N+α | N |
| $R_3$ | 640 | 480 | N+α | N−1 |
| ..... | ............ | ............ | ..... | ..... |
| $R_N$ | | | N+α | 2 |
| $R_S$ (THUMBNAIL) | 176 | 144 | − | − |

MANAGEMENT DEVICE AND IMAGE PROCESSING SYSTEM

TECHNICAL FIELD

The present disclosure relates to a management device for distributing and secretly managing video data and an image processing system using the management device.

BACKGROUND ART

PTL 1 discloses a technique in which main video data is received through a first path (broadcast wave), difference data of high image quality is received through a second path (network) in case of need, and the main video data and the difference data are combined. In the technique described in PTL 1, the video data is reproduced only by acquiring the main video data.

An object of the present disclosure is that as more pieces of distributed data are gathered, image data with higher resolutions can be reproduced and security for copyright, privacy, or the like can be secured in each piece of distributed data in a case where a content video, a surveillance camera video, and the like are transmitted and accumulated in a network environment.

CITATION LIST

Patent Literature

PTL 1: Japanese Patent Unexamined Publication No. 2014-138314

SUMMARY OF THE INVENTION

A management device of the present disclosure is configured to include a resolution converter which converts input image data to N types (N is a plural number) of image data having resolutions different with each other; a secret sharing unit which performs secret sharing schemes so that the plurality a pieces of image data is respectively divided into n pieces (n is an integer equal to or more than N+1 and the same value in all of image data) of distributed data and the distributed data is reconstructed to original image data using k pieces (k is an integer equal to or more than 2 and equal to or less than n and different value for each piece of image data) among n pieces; and a data combination unit which generates n pieces of combination data by combining distributed data selected one by one so as not to overlap with each of resolutions and stores each piece of the combination data in different storages.

An image processing system of the present disclosure is configured to include the management device and a storage for storing the combination data.

BRIEF DESCRIPTION OF DRAWINGS

FIG. 3 is a diagram illustrating an example of information stored in the video management server according to Embodiment 1 of the present disclosure.

DESCRIPTION OF EMBODIMENTS

Hereinafter, an image processing system according to an embodiment of the present disclosure will be described with reference to drawings.

Embodiment 1

In Embodiment 1, a case of using secret sharing schemes of a reversible method will be described.

Figure 1:
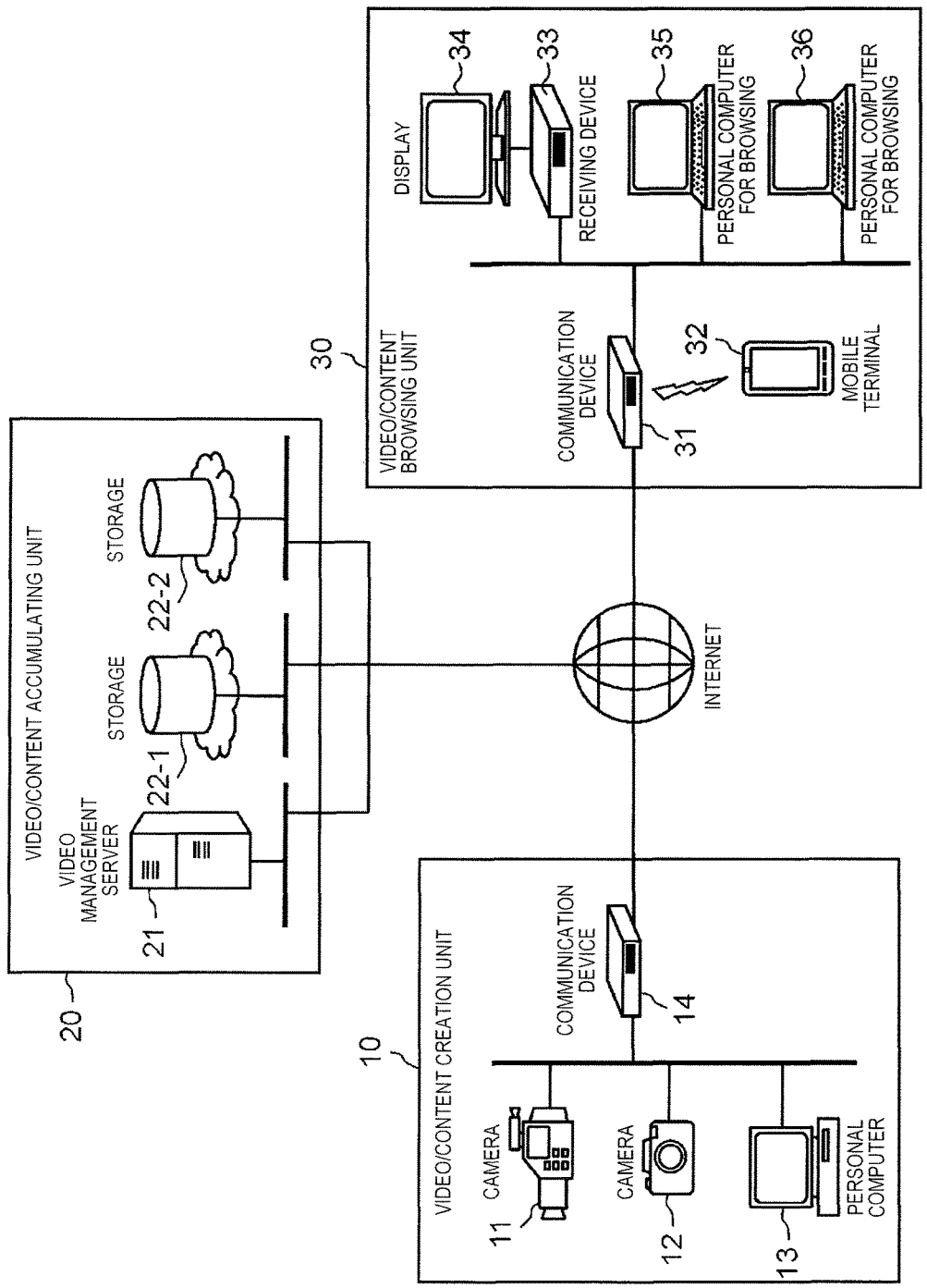
FIG. 1 is a diagram illustrating a configuration of an image processing system according to Embodiment 1 of the present disclosure.

FIG. 1 is a diagram illustrating a configuration of the image processing system according to the present embodiment. The image processing system is configured to mainly include video/content creation unit 10, video/content accumulating unit 20, and video/content browsing unit 30.

Video/content creation unit 10 transmits video data created by cameras 11 and 12, video data stored in personal computer 13, and the like to video/content accumulating unit 20 via communication device 14 such as router/modem connected with the Internet.

Video/content accumulating unit 20 creates distributed data by processing the video data received from video/content creation unit 10 in video management server 21 and distributes and stores the distributed data in a plurality of storage 22 (22-1, 22-2, ..., 22-n). An internal configuration of video management server 21 and a state in which the distributed data of storage 22 is stored will be described below.

In video/content browsing unit 30, the distributed data stored in plurality of storage 22 is received by receiving device 33 via communication device 31 such as router/modem, receiving device 33 reconstructs video data by combining the received distributed data, and the reconstructed video data is output on display 34. Processing implemented by receiving device 33 may be implemented by innards of mobile terminal 32 or personal computers 35 and 36. In addition, an internal configuration of receiving device 33 will be described below.

Figure 2:
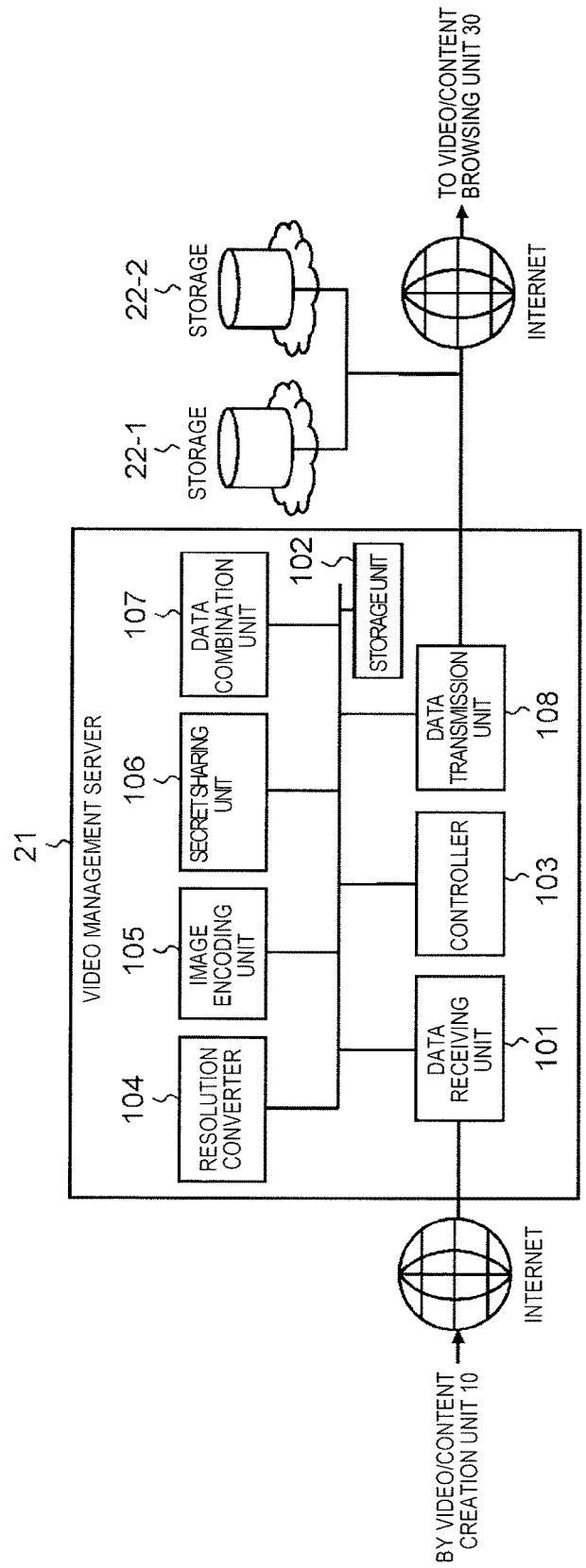
FIG. 2 is a block diagram illustrating an internal configuration of a video management server according to Embodiment 1 of the present disclosure.

Next, an internal configuration of video management server 21 will be described using a block diagram of FIG. 2. As illustrated in FIG. 2, video management server 21 is configured to mainly include data receiving unit 101, storage unit 102, controller 103, resolution converter 104, image encoding unit 105, secret sharing unit 106, data combination unit 107, and data transmission unit 108.

Data receiving unit 101 receives video data transmitted from video/content creation unit 10 via the Internet and outputs the video data to controller 103 and resolution converter 104.

In storage unit 102, N types (N is an integer equal to or more than 2) of resolutions after conversion, a resolution conversion parameter (the number of horizontal pixels and the number of vertical pixels) for each of resolutions after conversion, and a secret sharing parameter (n (sharing number) and k (threshold)) are stored in association with each other in table form for each of resolutions of original image data which is image data before conversion (see FIG. 3). n is N+α (α is an integer equal to or more than 1). In addition, k is an integer equal to or more than 2 and equal to or less than n. In addition, in the present embodiment, k adopts different values for each of resolutions after conversion and adopts a larger value as a resolution is higher.

Controller 103 selects N types of resolutions after conversion based on resolutions (number of pixels) of image data of video data input from data receiving unit 101 and gives an instruction for the resolution after conversion to resolution converter 104.

Resolution converter 104 converts resolutions of video data (original image data) input from data receiving unit 101 to each of resolutions according to the instruction given by controller 103 based on information (resolution conversion parameter corresponding to each of resolutions) stored in storage unit 102, generates video data of N types of resolutions, and outputs the video data to image encoding unit 105. In a case of adding a thumbnail (reduced image) in addition to the video data of N types of resolutions, resolution converter 104 converts resolutions of original image data to resolution RS for a thumbnail, generates a thumbnail, and outputs the thumbnail to image encoding unit 105.

Image encoding unit 105 performs compression encoding processing to image data of each of resolutions output from resolution converter 104 and outputs the image data to secret sharing unit 106. In a case of adding a thumbnail, image encoding unit 105 performs the compression encoding processing to the thumbnail and outputs the thumbnail to data combination unit 107.

Figure 4:
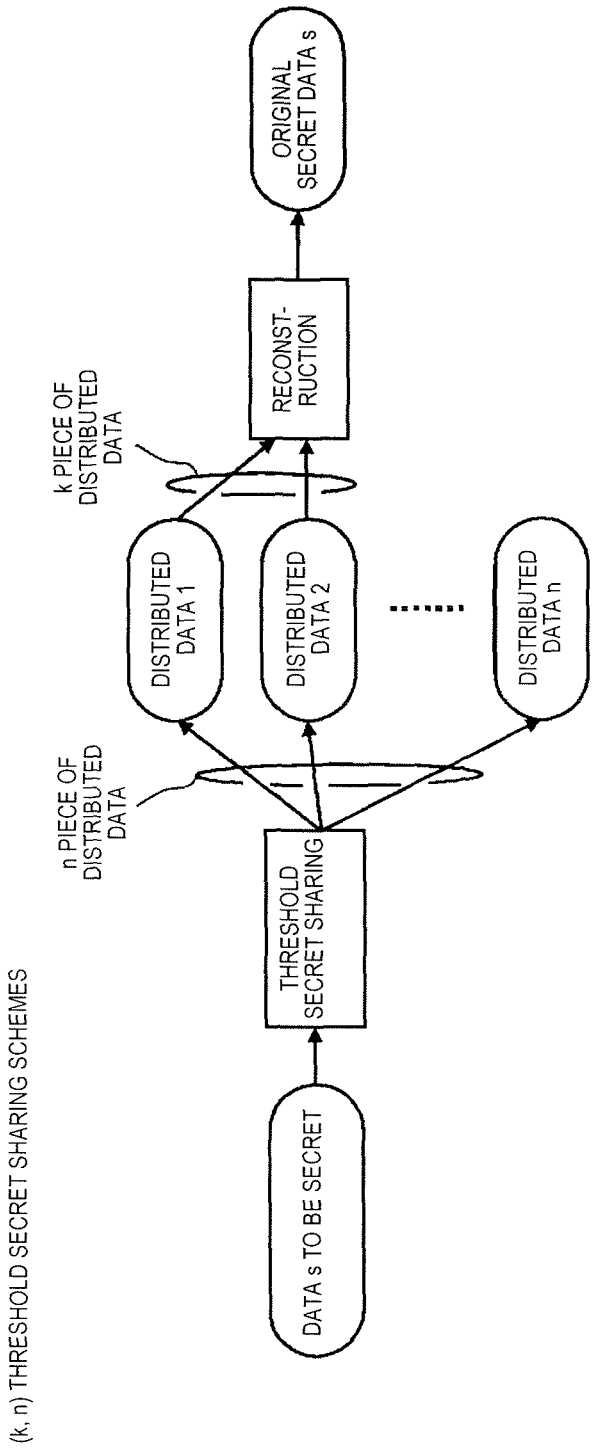
FIG. 4 is a diagram for explaining secret sharing schemes.

Secret sharing unit 106 performs the secret sharing schemes to each piece of image data after the compression encoding processing output from image encoding unit 105 based on information (secret sharing parameter corresponding to each of resolutions) stored in storage unit 102, generates n pieces of distributed data for each of resolutions, outputs the distributed data to data combination unit 107. In the secret sharing schemes, one piece of data s to be secret is divided into a plurality of n pieces of distributed data. Although the distributed data is reconstructed to original data s if k (k≤n) among n pieces is used, the distributed data cannot be reconstructed to the original data s if less thank pieces of distributed data are used (see FIG. 4). By performing the secret sharing schemes, even if distributed data is stolen, if the number of pieces is less than k, original data s cannot be reconstructed, so high security can be realized for individual distributed data. In addition, by setting the number k of distributed data necessary for reconstruction for each of resolutions so that k becomes smaller as a resolution of image data becomes lower, it is possible to reconstruct an image with a low resolution even with a small amount of distributed data and to reproduce higher resolution video as more pieces of distributed data are gathered.

Data combination unit 107 adds a start marker, a secret sharing parameter, and an end marker to each piece of distributed data, combines distributed data selected one by one so as not to overlap with each of resolutions, and generates combination data. Accordingly, n pieces of combination data are generated in total. In a case of adding a thumbnail, data combination unit 107 adds all of thumbnails after compression encoding to the combination data.

Data transmission unit 108 transmits and stores n pieces of combination data which are generated to and in different storage 22-$i$ (i is an integer equal to or more than 1 and equal to or less than n). Storage 22-$i$ may be connected via intranet or connected via the Internet.

Further, there is also a case where data transmission unit 108 has a function of selecting j pieces (j is an integer equal to or more than 2 and equal to or less than n) of combination data from storage 22-$i$ according to a request from receiving device 33 and transmitting the combination data to receiving device 33.

Figure 5:
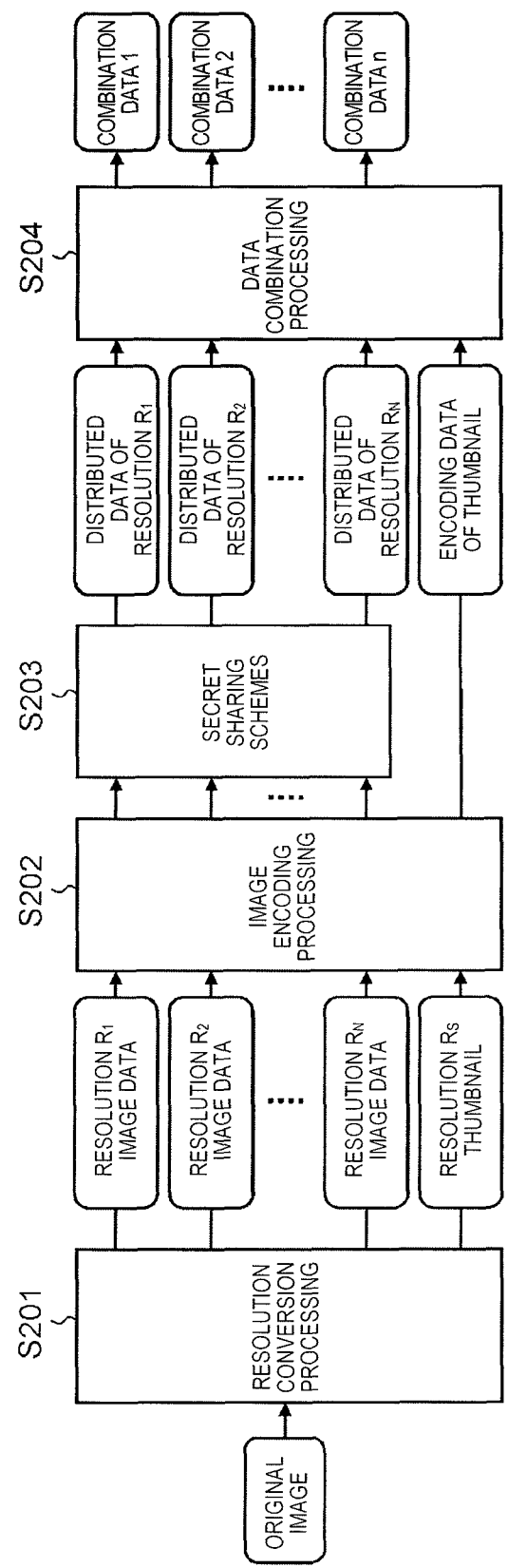
FIG. 5 is a diagram illustrating a procedure of processing performed by the video management server according to Embodiment 1 of the present disclosure.

Next, a procedure of processing performed by video management server 21 will be described using FIG. 5.

First of all, resolution converter 104 converts resolutions of original image data and generates image data of N types of resolutions. In a case of adding a thumbnail, resolution converter 104 generates image data of a resolution for the thumbnail (S201).

Next, image encoding unit 105 performs the compression encoding processing with respect to image data of each of N types of resolutions. In a case of adding a thumbnail, image encoding unit 105 also performs the compression encoding processing with respect to image data for the thumbnail (S202).

Next, secret sharing unit 106 performs the secret sharing schemes with respect to image data after the compression encoding of each of N types of resolutions except for the thumbnail, and generates n pieces of distributed data for each of resolutions (S203).

Next, data combination unit 107 generates n pieces of combination data by combining distributed data selected one by one so as not to overlap with each of resolutions. In a case of adding a thumbnail, the thumbnail is added to all of combination data (S204).

Figure 6:
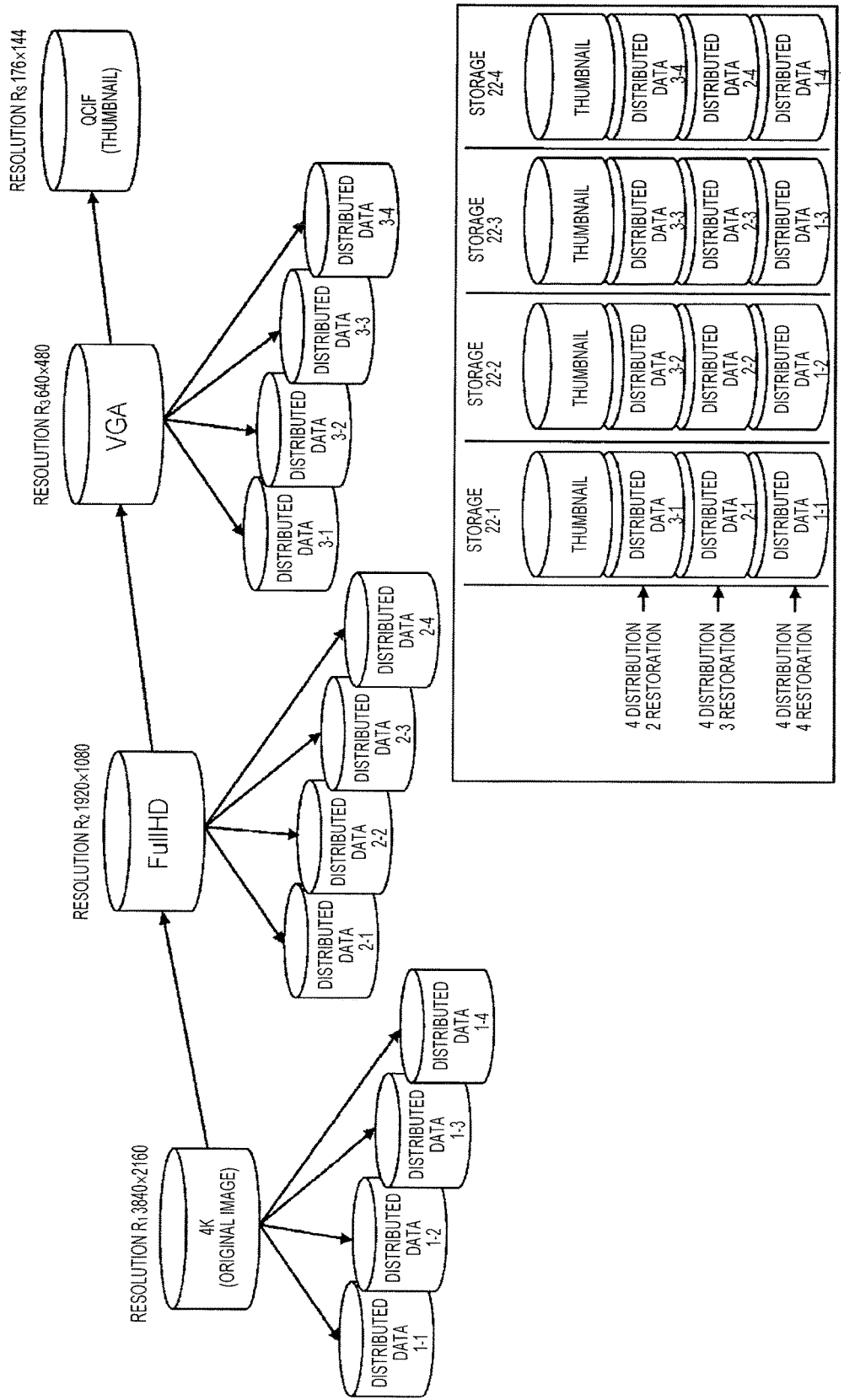
FIG. 6 is a diagram illustrating a concrete example of processing performed by the video management server according to Embodiment 1 of the present disclosure.

Next, a concrete example of processing performed by video management server 21 will be described using FIG. 6. An example of FIG. 6 illustrates a case where original image data has resolution R1 (3840×2160 dots), N=3, n=4, and with a thumbnail.

In this case, image data of three types of resolution R1 (3840×2160 dots), resolution R2 (1920×1080 dots), and resolution R3 (640×480 dots) and a thumbnail are generated. The image data of each of resolutions is respectively divided into four pieces of distributed data by the secret sharing schemes.

Here, it is possible to reconstruct image data of resolution R1 to original image data using the four pieces of distributed data. In addition, it is possible to reconstruct image data of resolution R2 to original image data using three pieces of distributed data. In addition, it is possible to reconstruct image data of resolution R3 to original image data using two pieces of distributed data. A thumbnail is a reduced image of original image data. For example, the thumbnail is in a state of a low value as image in which the thumbnail is deteriorated to such a degree that copyright cannot be claimed in a content video or deteriorated to such a degree that privacy information is not included in a surveillance camera video. Even if the thumbnail is reproduced, security for copyright and privacy is secured. In addition, original image data cannot be reconstructed from the thumbnail.

After performing the secret sharing schemes, distributed data 1-1, 2-1, and 3-1 selected one by one from each of resolutions R1, R2, and R3 so as not to overlap with each other are combined with a thumbnail and stored in storage 22-1. In the same manner, distributed data 1-2, 2-2, and 3-2 selected one by one from each of resolutions R1, R2, and R3 so as not to overlap with each other are combined with a thumbnail and stored in storage 22-2. Distributed data 1-3, 2-3, and 3-3 selected one by one from each of resolutions R1, R2, and R3 so as not to overlap with each other are combined with a thumbnail and stored in storage 22-3. Distributed data 1-4, 2-4, and 3-4 selected one by one from each of resolutions R1, R2, and R3 so as not to overlap with each other are combined with a thumbnail and stored in storage 22-4.

Figure 7:
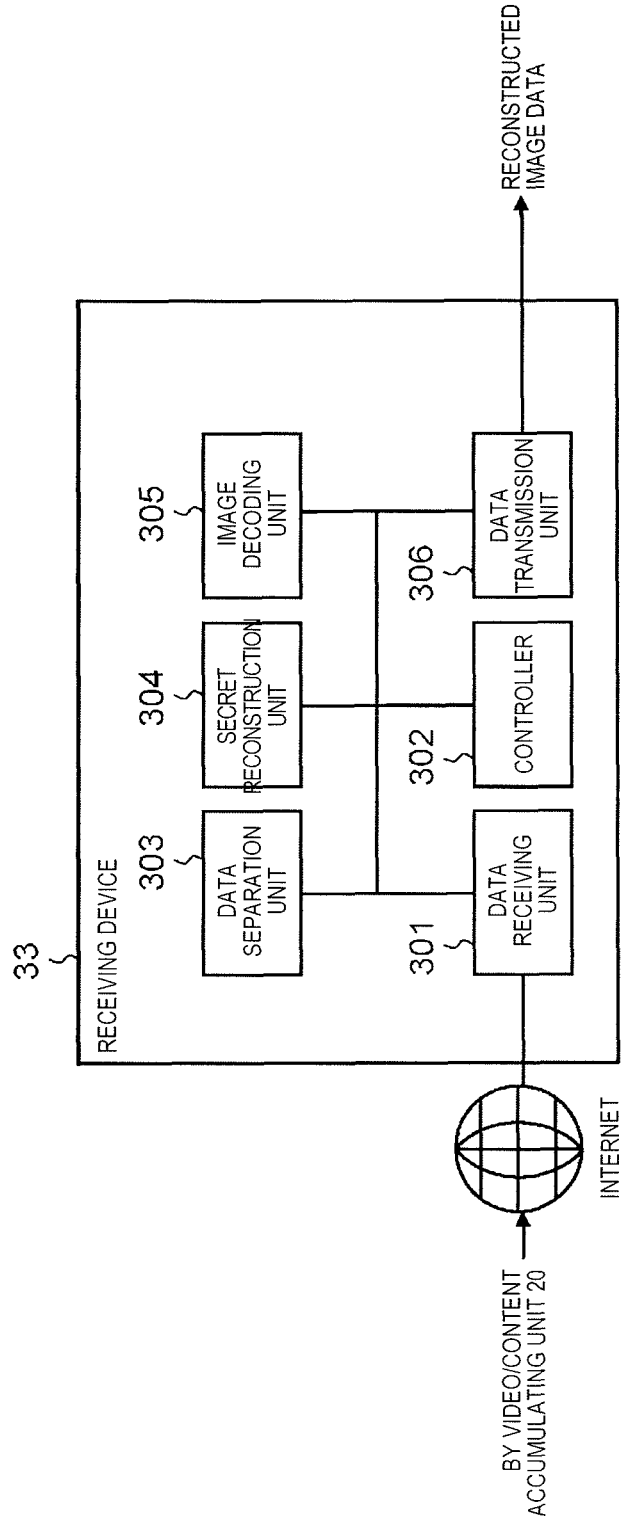
FIG. 7 is a block diagram illustrating an internal configuration of a receiving device according to Embodiment 1 of the present disclosure.

Next, an internal configuration of receiving device 33 will be described using a block diagram of FIG. 7. As illustrated in FIG. 7, receiving device 33 is configured to mainly include data receiving unit 301, controller 302, data separation unit 303, secret reconstruction unit 304, image decoding unit 305, and data transmission unit 306.

Data receiving unit 301 receives j pieces (j is an integer equal to or more than 2 and equal to or less than n) of combination data from storage 22-$i$ (i is an integer equal to or more than 1 and equal to or less than n) via the Internet and outputs the combination data to controller 302 and data separation unit 303.

Here, the number of pieces of combination data which can be received by data receiving unit 301 is determined based on user's authority or the like. For example, data receiving unit 301 can access and receive more pieces of combination data as a user has higher authority (which pays a higher fee for a system, has higher access authority as a data administrator, or the like). Accordingly, a higher authority user can browse higher quality image data.

Data received by data receiving unit 301 may be configured such that video management server 21 selects j pieces of combination data from storage 22-$i$ and transmits the combination data according to a request from receiving device 33.

Controller 302 selects a resolution of reconstructed image data (hereinafter, referred to as "reconstruction image data") and gives an instruction for distributed data of the selected resolution to data separation unit 303 based on the number j of pieces of combination data input from data receiving unit 301=k.

For example, as illustrated in FIG. 6, in a case where distributed data is created with N=3 and n=4, since resolution R2 can be reconstructed if j=k=3, a resolution of reconstruction image data becomes R2 and an instruction for three pieces of distributed data (for example, distributed data 2-1, 2-2, and 2-3) of resolution R2 is given to data separation unit 303.

Data separation unit 303 separates the distributed data according to the instruction given by controller 302 from each piece of combination data and outputs the distributed data to secret reconstruction unit 304.

Secret reconstructing unit 304 performs reconstruction of a secret with respect to the distributed data output from data separation unit 303 and outputs reconstruction image data to image decoding unit 305. Image data reconstructed by secret reconstruction unit 304 is in an encoded state.

Image decoding unit 305 performs decoding processing corresponding to the compression encoding of image encoding unit 105 with respect to the reconstruction image data output from secret reconstruction unit 304, generates reconstruction image data which a user can watch, and outputs the reconstruction image data to data transmission unit 306.

Data transmission unit 306 outputs the reconstruction image data output from image decoding unit 305 to display 34 and the reconstruction image data is displayed on display 34.

Figure 8:
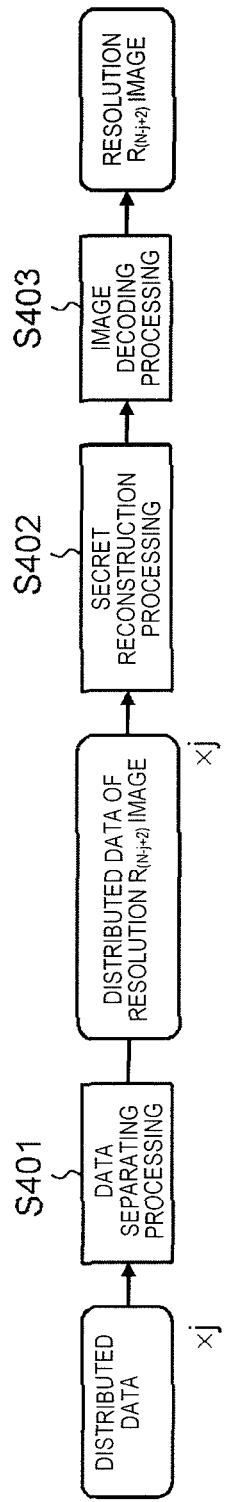
FIG. 8 is a diagram illustrating a procedure of processing performed by the receiving device according to Embodiment 1 of the present disclosure.

Next, a procedure of processing performed by receiving device 33 will be described using FIG. 8.

First of all, data separation unit 303 separates k pieces of distributed data of a resolution corresponding to j=k from j pieces of combination data (S401).

Next, secret reconstruction unit 304 performs the reconstruction of the secret with respect to k pieces of distributed data. Further, image decoding unit 305 performs the decoding processing and generates reconstruction image data which a user can watch (S402 and S403).

The reconstruction image data generated by image decoding unit 305 is displayed on display 34. In addition, the processing performed by receiving device 33 may be implemented by innards of mobile terminal 32 or personal computers 35 and 36.

As described above, according to the present embodiment, the secret sharing schemes is performed so that a plurality of pieces of image data having resolutions different with each other is divided into n pieces (n is an integer equal to or more than 3 and the same value in all image data) of distributed data and the distributed data is reconstructed to original image data using k pieces (k is an integer equal to or more than 2 and equal to or less than n and different value for each piece of image data) among n pieces, n pieces of combination data are generated by combining distributed data selected one by one so as not to overlap with each of resolutions, and each piece of combination data is stored in different storages. Accordingly, as more pieces of distributed data are gathered, image data with higher resolutions can be reproduced and security for copyright, privacy, or the like can be secured in each piece of distributed data.

Embodiment 2

In Embodiment 2, a case of using secret sharing schemes of a non-reversible method will be described. A configuration of the image processing system of the present embodiment is the same as that in FIG. 1 used in Embodiment 1.

First, an internal configuration of video management server 21$a$ according to the present embodiment will be described using FIG. 9. In video management server 21$a$ illustrated in FIG. 9, the same reference numerals as those in FIG. 2 are assigned to portions common to video management server 21 illustrated in FIG. 2, and a detailed description thereof will be omitted.

Figure 9:
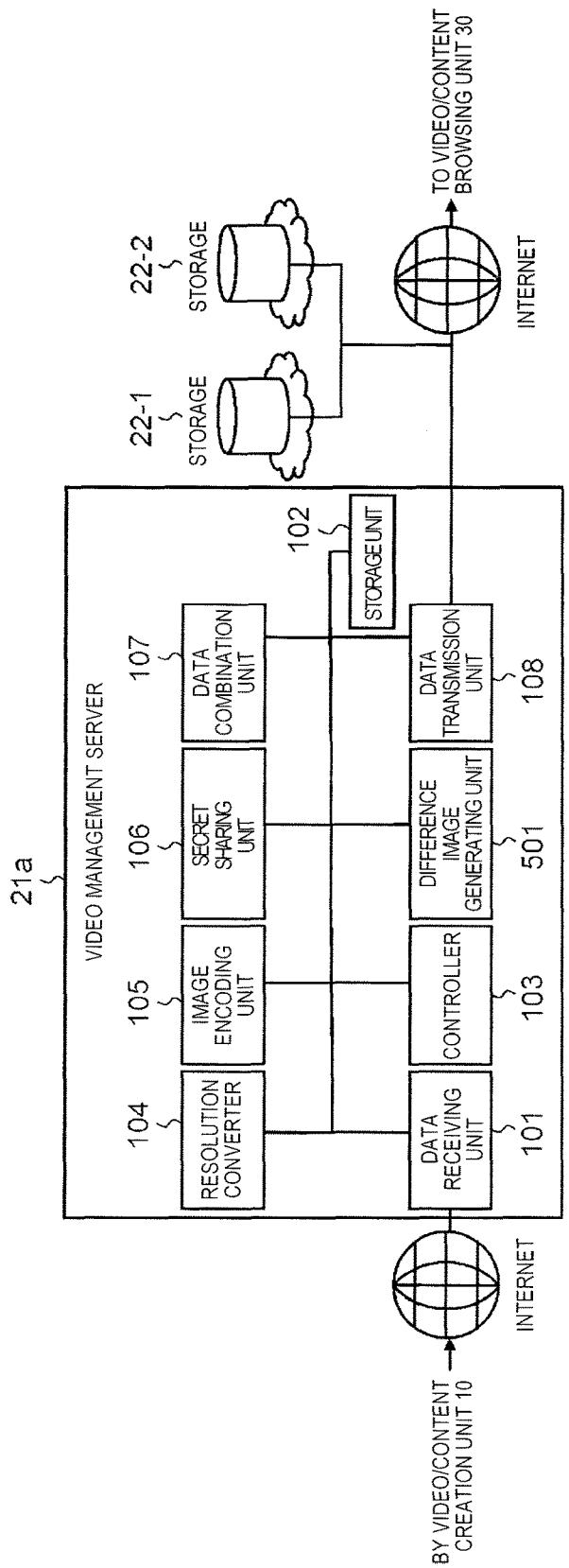
FIG. 9 is a block diagram illustrating an internal configuration of a video management server according to Embodiment 2 of the present disclosure.

Video management server 21$a$ illustrated in FIG. 9 adopts a configuration in which difference image generating unit 501 is added to video management server 21 illustrated in FIG. 2.

Resolution converter 104 generates image data of N types of resolutions and a thumbnail and outputs the image data and the thumbnail to difference image generating unit 501.

Difference image generating unit 501 generates N pieces of difference image data from the image data of N types of resolutions and the thumbnail. Specifically, difference image generating unit 501 adopts a difference between image data of resolution Rm (m is an integer equal to or more than 1 and equal to or less than N−1 and the smaller m, the higher resolution) and image data of resolution Rm+1, so that difference data of resolution Rm is generated. In addition, difference image generating unit 501 adopts a difference between image data of resolution RN and the thumbnail, so that difference data of resolution RN is generated. Difference image generating unit 501 outputs N pieces of difference data to image encoding unit 105.

Image encoding unit 105 performs the compression encoding processing to each piece of difference data output from difference image generating unit 501 and outputs the difference data to secret sharing unit 106. In addition, image encoding unit 105 performs the compression encoding processing to image data for a thumbnail and outputs the image data to data combination unit 107.

Secret sharing unit 106 performs the secret sharing schemes to each piece of difference data after the compression encoding processing output from image encoding unit 105, generates n pieces of distributed data for each piece of difference data, and outputs the distributed data to data combination unit 107.

Figure 10:
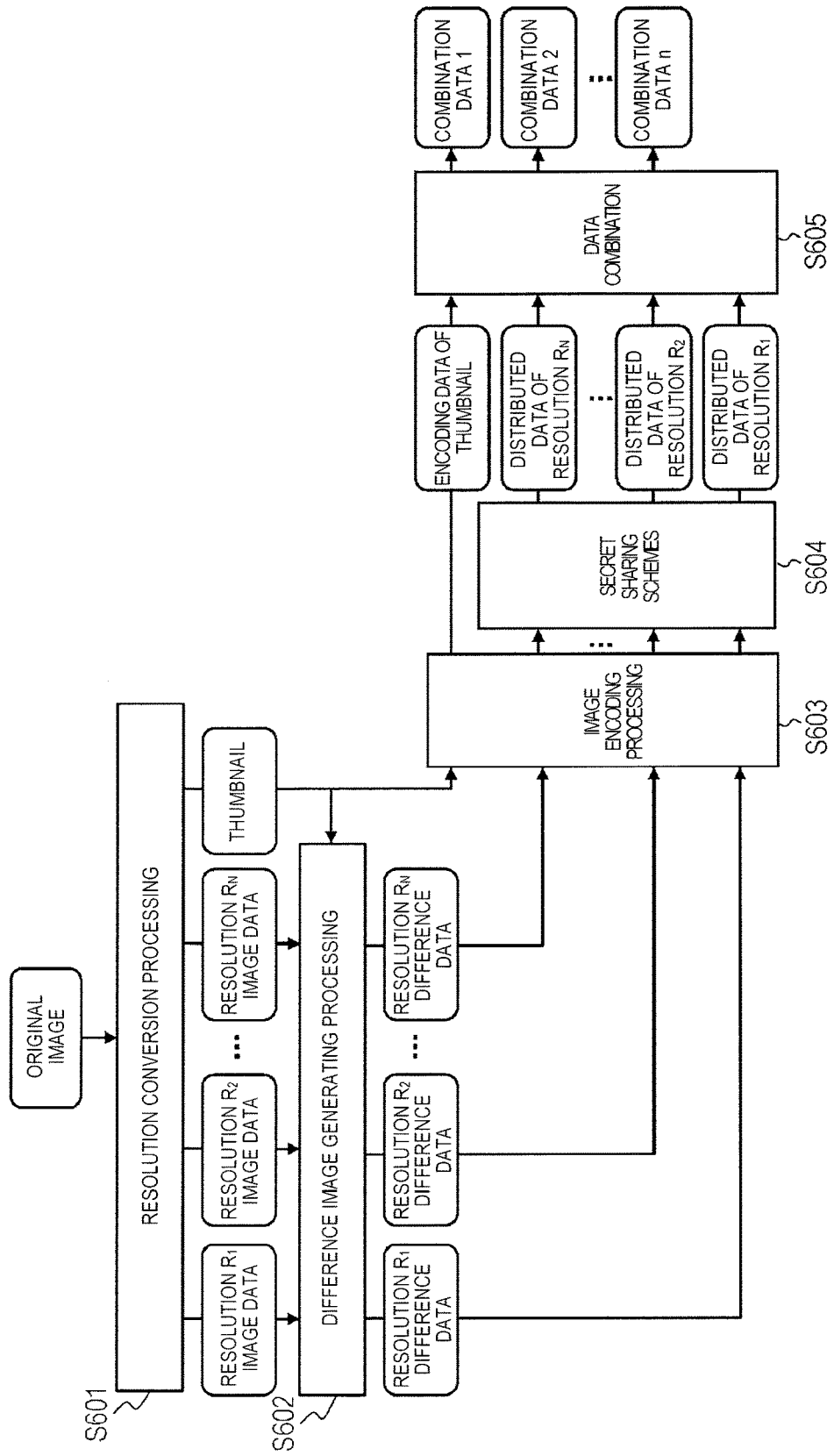
FIG. 10 is a diagram illustrating a procedure of processing performed by the video management server according to Embodiment 2 of the present disclosure.

Next, a procedure of processing performed by video management server 21*a* will be described using FIG. 10.

First of all, resolution converter 104 converts resolutions of original image data and generates image data of N types of resolutions and image data of a resolution for a thumbnail (S601).

Next, difference image generating unit 501 generates N pieces of difference data from the image data of N types of resolutions and the thumbnail (S602).

Next, image encoding unit 105 performs the compression encoding processing with respect to each piece of the difference data and the thumbnail (S603).

Next, secret sharing unit 106 performs the secret sharing schemes with respect to N pieces of difference data after the compression encoding and generates n pieces of distributed data for each piece of the difference data (S604).

Next, data combination unit 107 generates n pieces of combination data by combining distributed data selected one by one so as not to overlap with each piece of difference data. A thumbnail is added to all of combination data (S605).

Figure 11:
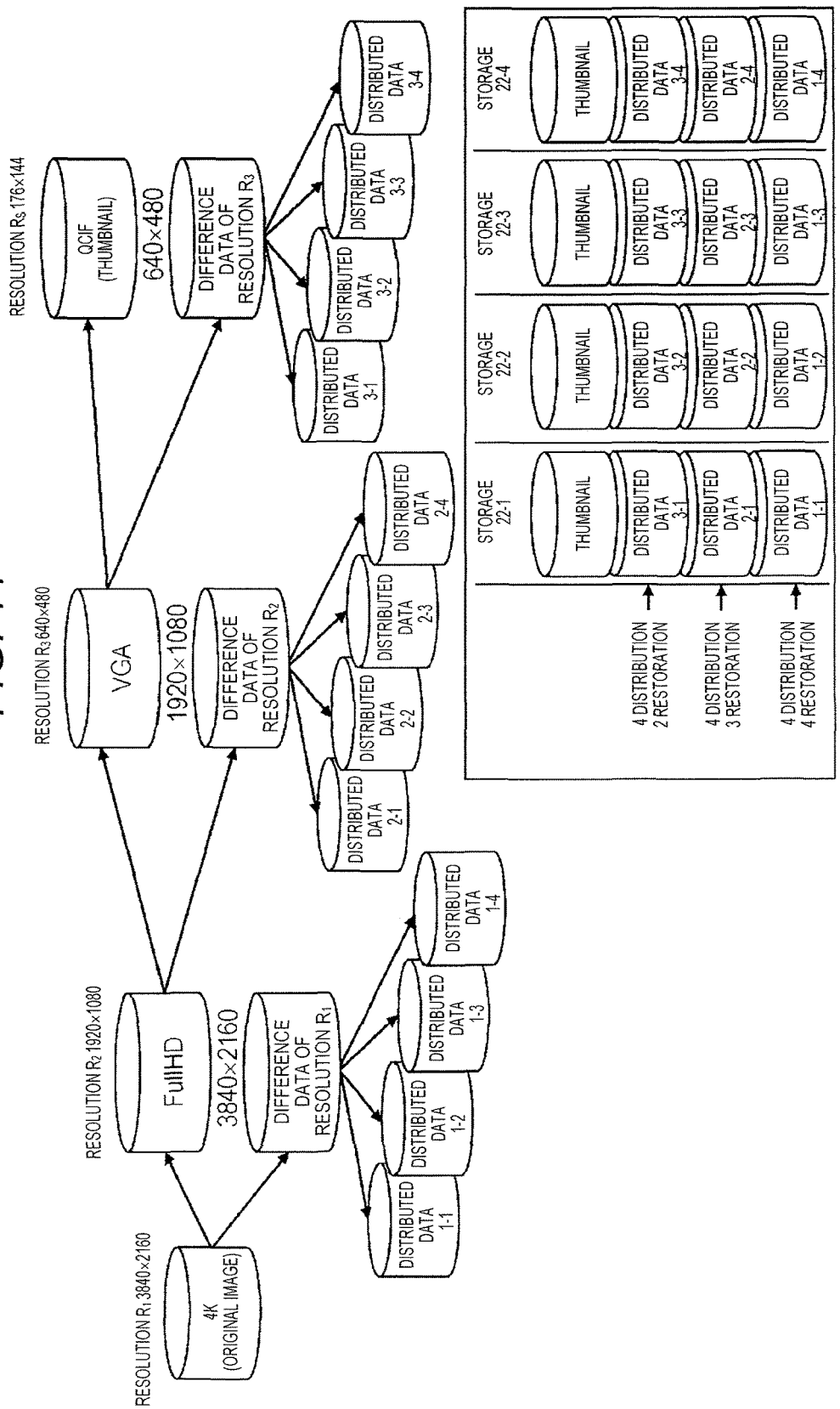
FIG. 11 is a diagram illustrating a concrete example of processing performed by the video management server according to Embodiment 2 of the present disclosure.

Next, a concrete example of processing performed by video management server 21*a* will be described using FIG. 11. An example of FIG. 11 illustrates a case where original image data has resolution R1 (3840×2160 dots), N=3, n=4, and with a thumbnail.

In this case, image data of three types of resolution R1 (3840×2160 dots), resolution R2 (1920×1080 dots), and resolution R3 (640×480 dots) and a thumbnail are generated.

Difference data of resolution R1 which is a difference between image data of resolution R1 and image data of resolution R2 is generated. In the same manner, difference data of resolution R2 which is a difference between image data of resolution R2 and image data of resolution R3 is generated. In the same manner, difference data of resolution R3 which is a difference between image data of resolution R3 and the thumbnail is generated. The difference data of each of resolutions is respectively divided into four pieces of distributed data by performing the secret sharing schemes.

It is possible to reconstruct difference data of resolution R1 to original difference data using four pieces of distributed data. It is possible to reconstruct difference data of resolution R2 to original difference data using three pieces of distributed data. In addition, it is possible to reconstruct difference data of resolution R3 to original difference data using two pieces of distributed data.

In addition, it is possible to reconstruct image data of resolution R3 using a thumbnail and difference data of resolution R3. In addition, it is possible to reconstruct image data of resolution R2 using image data of resolution R3 and difference data of resolution R2. In addition, it is possible to reconstruct image data of resolution R1 using image data of resolution R2 and difference data of resolution R1.

After performing the secret sharing schemes, distributed data 1-1, 2-1, and 3-1 selected one by one from each of resolutions R1, R2, and R3 so as not to overlap with each other are combined with a thumbnail and stored in storage 22-1. In the same manner, distributed data 1-2, 2-2, and 3-2 selected one by one from each of resolutions R1, R2, and R3 so as not to overlap with each other are combined with a thumbnail and stored in storage 22-2. Distributed data 1-3, 2-3, and 3-3 selected one by one from each of resolutions R1, R2, and R3 so as not to overlap with each other are combined with a thumbnail and stored in storage 22-3. Distributed data 1-4, 2-4, and 3-4 selected one by one from each of resolutions R1, R2, and R3 so as not to overlap with each other are combined with a thumbnail and stored in storage 22-4.

Next, an internal configuration of receiving device 33*a* according to the present embodiment will be described using FIG. 12. In receiving device 33*a* illustrated in FIG. 12, the same reference numerals as those in FIG. 7 are assigned to portions common to receiving device 33 illustrated in FIG. 7, and a detailed description thereof will be omitted.

Figure 12:
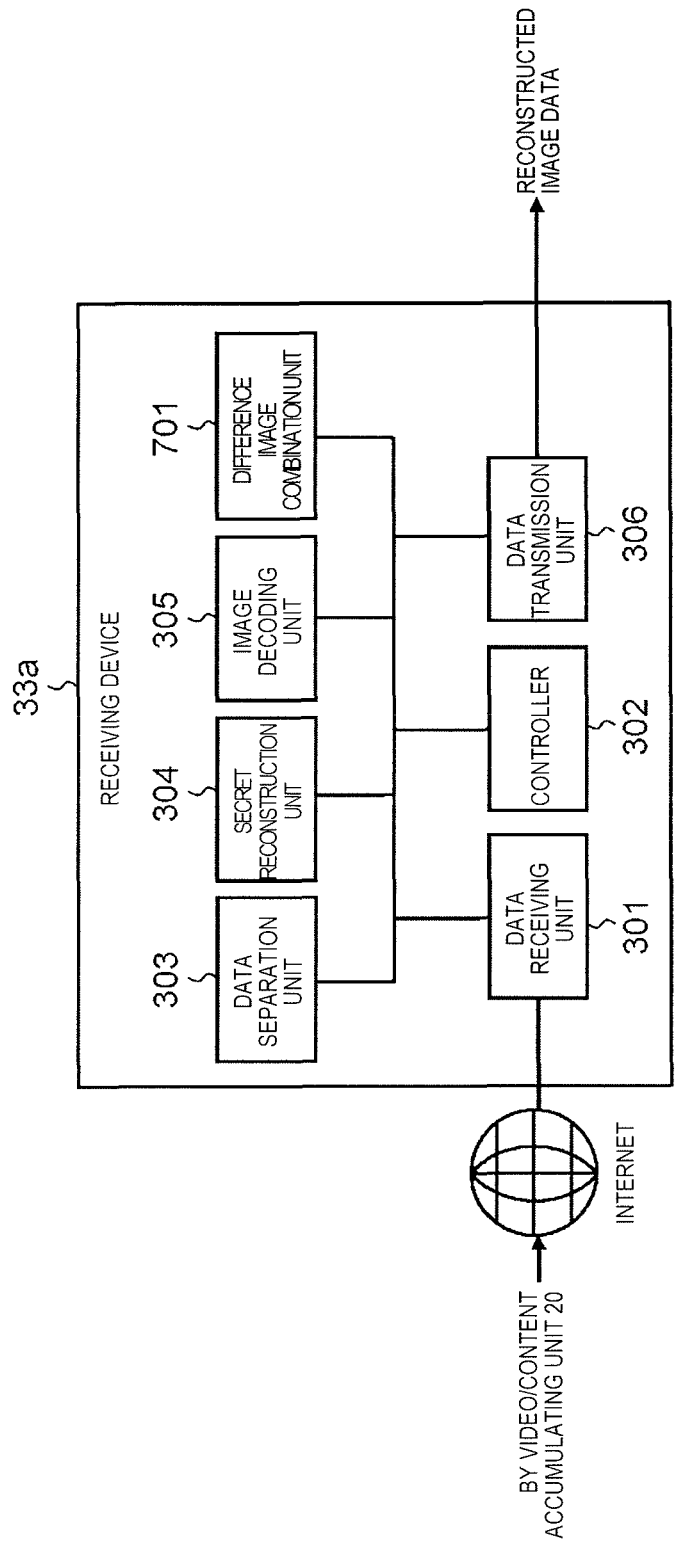
FIG. 12 is a block diagram illustrating an internal configuration of a receiving device according to Embodiment 2 of the present disclosure.

Receiving device 33*a* illustrated in FIG. 12 adopts a configuration in which difference image combination unit 701 is added to receiving device 33 illustrated in FIG. 7.

Controller 302 selects a resolution of reconstruction image data and gives an instruction for distributed data necessary for generating reconstruction image data of the selected resolution to data separation unit 303 based on the number j of pieces of combination data input from data receiving unit 301=k. For example, in order to generate reconstructed image data of resolution Rm, difference data with resolution Rm and a resolution lower than resolution Rm and a thumbnail are necessary. In order to reconstruct each piece of difference data, distributed data corresponding to each of resolutions is necessary. The number of pieces of necessary distributed data differs according to each of resolutions, and the number of pieces of necessary distributed data is smaller as a resolution is lower.

Data separation unit 303 separates the distributed data according to the instruction given by controller 302 and a thumbnail from each piece of combination data, outputs the distributed data to secret reconstruction unit 304, and outputs the thumbnail to image decoding unit 305.

Secret reconstruction unit 304 performs reconstruction of the secret with respect to the distributed data output from data separation unit 303 and outputs reconstructed difference data (hereinafter, referred to as "reconstruction difference data") to image decoding unit 305. Difference data reconstructed by secret reconstruction unit 304 is in an encoded state.

Image decoding unit 305 performs the decoding processing corresponding to the compression encoding of image encoding unit 105 with respect to the thumbnail output from data separation unit 303 and the reconstruction difference data output from secret reconstruction unit 304, and outputs the thumbnail and the reconstruction difference data to difference image combination unit 701.

Difference image combination unit 701 performs combination processing with respect to the thumbnail and the reconstruction difference data output from image decoding unit 305 and generates reconstruction image data which a user can watch.

Figure 13:
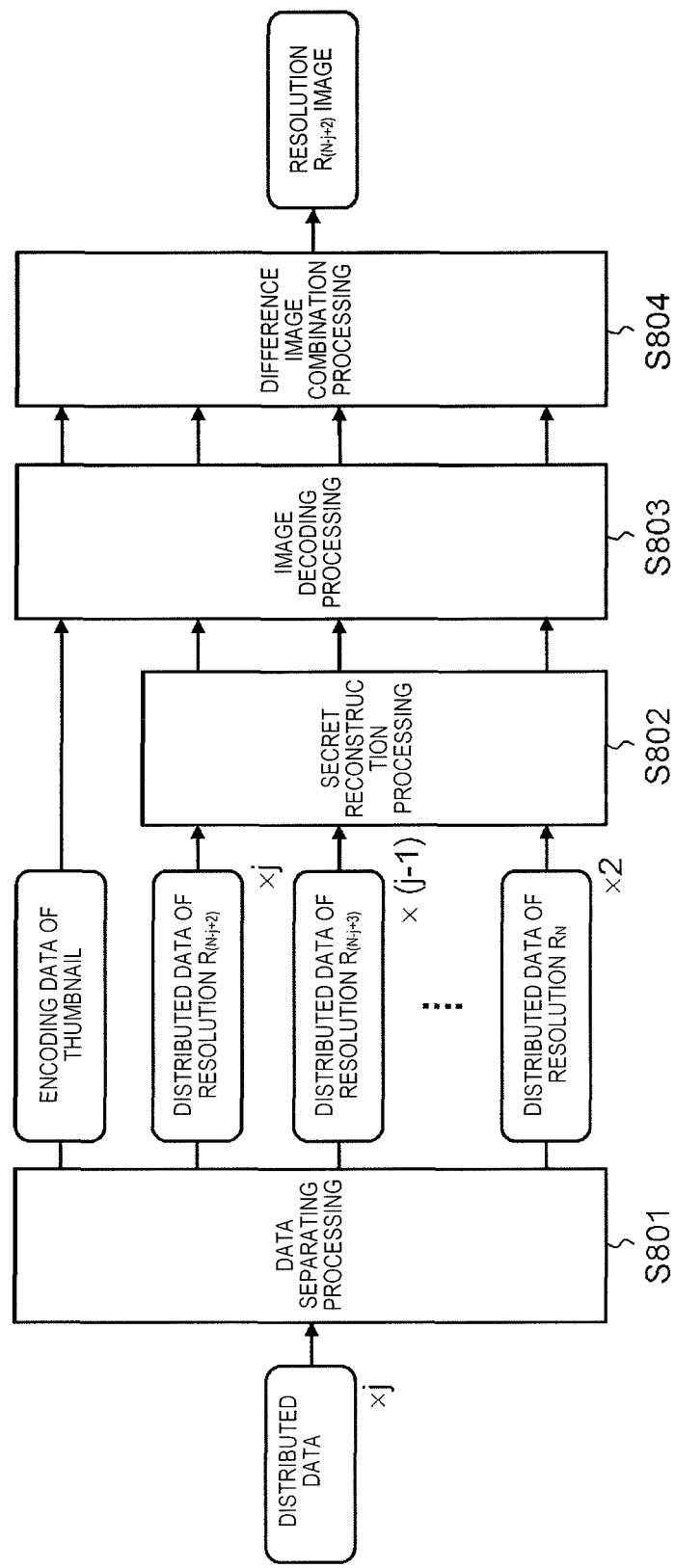
FIG. 13 is a diagram illustrating a procedure of processing performed by the receiving device according to Embodiment 2 of the present disclosure.

Next, a procedure of processing performed by receiving device 33a will be described using FIG. 13.

First of all, data separation unit 303 separates distributed data of resolution R(N−j+2) corresponding to j=k and distributed data of resolution (RN~R(N−j+3)) lower than the resolution from j pieces of combination data (S801).

Next, secret reconstruction unit 304 performs the reconstruction of the secret with respect to distributed data of each of resolutions. Here, the number k of pieces of distributed data necessary for the reconstruction of the secret differs according to each of resolutions, and the number of pieces of necessary distributed data is smaller as a resolution is lower. Further, image decoding unit 305 performs the decoding processing and generates a thumbnail and reconstruction difference data (S802 and S803).

Next, difference image combination unit 701 performs the combination processing with respect to the thumbnail and the reconstruction difference data and generates reconstruction image data which a user can watch (S804).

The reconstruction image data generated by difference image combination unit 701 is displayed on display 34. In addition, the processing performed by receiving device 33a may be implemented by innards of mobile terminal 32 or personal computers 35 and 36.

As described above, according to the present embodiment, the secret sharing schemes is performed so that a plurality of pieces of difference data is generated from a plurality of pieces of image data having resolutions different with each other, the difference data is respectively divided into n pieces (n is an integer equal to or more than 3 and the same value in all of difference data) of distributed data, and the distributed data is reconstructed to original difference data using k pieces (k is an integer equal to or more than 2 and equal to or less than n and different value for each piece of difference data) among n pieces, n pieces of combination data are generated by combining distributed data selected one by one so as not to overlap with each of resolutions, and each piece of combination data is stored in different storages. Accordingly, as more pieces of distributed data are gathered, image data with higher resolutions can be reproduced and security for copyright, privacy, or the like can be secured in each piece of distributed data.

In Embodiment 1 and Embodiment 2, processing implemented by video management server 21 may be implemented by personal computer 13 or the like. In addition, the processing implemented by receiving device 33 may be implemented by mobile terminal 32 or personal computers 35 and 36.

In addition, storage 22-i may be a cloud storage or can use an on-premise server storage or a part of storage of a personal computer, a camera, or a mobile terminal.

In addition, when reconstructing the distributed data stored in storage 22-i, the video management server 21 may select distributed data necessary for reconstruction and may transmit the distributed data to receiving device 33 or 33a. Receiving device 33 or 33a may select necessary distributed data and may download the distributed data from storage 22-i.

In addition, although, in data combination unit 107, there is a configuration in which distributed data selected one by one so as not to overlap with each of resolutions is combined as a file, distributed data of each of groups may be stored in different storages as a group without combining the distributed data as the file. In this configuration, the same effect as a case of combining the file can be obtained by managing a storage able to be accessed based on user's authority or the like.

In addition, although descriptions with respect to video data are performed in the present embodiment, the present disclosure can be applied not only to video data but also to still image data.

INDUSTRIAL APPLICABILITY

The present disclosure is appropriately used for the image processing system for distributing and secretly managing video data.

REFERENCE MARKS IN THE DRAWINGS 10 video/content creation unit
20 video/content accumulating unit
21 and 21a video management server
22 storage
30 video/content browsing unit
33 and 33a receiving device
101 and 301 data receiving unit
102 storage unit
103 and 302 controller
104 resolution converter
105 image encoding unit
106 secret sharing unit
107 data combination unit
108 and 306 data transmission unit
303 data separation unit
304 secret reconstruction unit
305 image decoding unit
501 difference image generating unit
701 difference image combination unit

The invention claimed is:

1. A management device comprising:
a resolution converter that converts original image data to N types of image data, each of the N types of image data corresponding to the original image data in a different resolution;
a secret sharing unit that performs secret sharing schemes so that each of the N types of image data is divided into n pieces of distributed data; and
a data combination unit that generates n pieces of combination data by combining in each of the n pieces of combination data, a different one of the n pieces of distributed data of each of the N types of image data, and that stores each of the n pieces of combination data in a different storage,
wherein, for each of the N types of image data, the original image data is configured to be reconstructed in the different resolution by using k pieces among the n pieces of distributed data,
N is a plural number,
n is an integer at least equal to N+1,
k is an integer equal to at least 2, less than n, and different for each of the N types of image data.

2. The management device of claim 1, further comprising:
a controller that selects resolutions based on a resolution of the original image data and transmits an instruction for the resolutions to the resolution converter.

3. The management device of claim 1, further comprising:
an image encoding unit that performs compression encoding processing to image data of each of the N types of image data output from the resolution converter, wherein the secret sharing unit performs the secret sharing schemes to the image data to which the compression encoding processing is performed.

4. The management device of claim 1, wherein the resolution converter outputs the original image data as a plurality of pieces of image data.

5. The management device of claim 1, wherein the secret sharing unit performs the secret sharing schemes so that k becomes smaller as the resolution of each of the N types of image data becomes lower.

6. The management device of claim 1, wherein the resolution converter generates a thumbnail of the original image data, and
each of the n pieces of combination data includes the thumbnail.

7. The management device of claim 1, further comprising;
a data transmission unit that transmits j pieces of combination data to a user according to a request from the user,
wherein j is an integer at least equal to 2 and less than n.

8. The management device of claim 7, wherein the data transmission unit determines the j pieces of combination data to be transmitted according to an authority of the user who issues the request.

9. An image processing system comprising:
the management device of claim 1; and
storages for storing the n pieces of combination data.

10. The management device of claim 1, wherein the resolution converter further converts the original image data to an additional type of image data, the additional type of image data having an additional resolution different from each of the N types of image data,
the secret sharing unit performs the secret sharing schemes so that the additional type of image data is divided into n pieces of distributed data,
the data combination unit generates each of the n pieces of combination data to further include a different one of the n pieces of distributed data of the additional type of image data, and
for the additional type of image data, the original image data is configured to be reconstructed in the additional resolution using n pieces among the n pieces of distributed data of the additional type of image data.

11. The management device of claim 1, wherein the secret sharing unit performs the secret sharing schemes so that the original image data is divided into n pieces of distributed data,
the data combination unit generates each of the n pieces of combination data to further include a different one of the n pieces of distributed data of the original image data, and
the original image data is configured to be reconstructed using n pieces among the n pieces of distributed data of the original image data.

12. The management device of claim 1, wherein, for the resolution of each of the N types of image data, the original image data cannot be reconstructed in the different resolution by using less than k pieces among the n pieces of distributed data.

13. The management device of claim 1, wherein k becomes smaller as the resolution of each of the N types of image data is lower.

14. The management device of claim 1, wherein storages, in which the each of the n pieces of combination data is stored, are connected via the Internet.

15. A management device comprising:
a resolution converter that converts original image data to N types of image data, each of the N types of image data corresponding to the original image data in a different resolution;
a difference image generating unit that generates a plurality of pieces of difference data, each of the plurality of pieces of difference data being a difference between image data with a m-th resolution and image data with a m+1-th resolution;
a secret sharing unit that performs secret sharing schemes so that each of the plurality of pieces of difference data is divided into n pieces of distributed data; and
a data combination unit that generates n pieces of combination data by combining in each of the n pieces of combination data, a different one of the n pieces of distributed data of each of the plurality of pieces of difference data, and that stores each of the n pieces of combination data in a different storage,
wherein, for each of the plurality of pieces of difference data, the original image data is configured to be reconstructed in the different resolution by using k pieces among the n pieces of distributed data,
N is a plural number,
m is an integer at least equal to 1 and at most equal to N−1,
n is an integer at least equal to N+1,
k is an integer equal to at least 2, less than n, and different for each of the plurality of pieces of difference data.

16. A management device comprising:
storages; and
a computer configured to perform operations including:
converting original image data to N types of image data, each of the N types of image data corresponding to the original image data in a different resolution;
performing secret sharing schemes so that each of the N types of image data is divided into n pieces of distributed data;
generating n pieces of combination data by combining, in each of the n pieces of combination data, a different one of the n pieces of distributed data of each of the N types of image data; and
storing each of the n pieces of combination data in a different one of the storages,
wherein, for each of the N types of image data, the original image data is configured to be reconstructed in the different resolution by using k pieces among the n pieces of distributed data,
N is a plural number,
n is an integer at least equal to N+1,
k is an integer equal to at least 2, less than n, and different for each of the N types of image data.

17. The management device of claim 16, wherein the computer further converts the original image data to an additional type of image data, the additional type of image data having an additional resolution different from each of the N types of image data,
the computer performs the secret sharing schemes so that the additional type of image data is divided into n pieces of distributed data,
the computer generates each of the n pieces of combination data to further include a different one of the n pieces of distributed data of the additional type of image data, and
for the additional type of image data, the original image data is configured to be reconstructed in the additional resolution by using n pieces among the n pieces of distributed data of the additional type of image data.

18. The management device of claim 16,
wherein the computer performs the secret sharing schemes so that the original image data is divided into n pieces of distributed data,
the computer generates each of the n pieces of combination data to further include a different one of the n pieces of distributed data of the original image data, and
the original image data is configured to be reconstructed using n pieces among the n pieces of distributed data of the original image data.

* * * * *